United States Patent [19]

Mancosu et al.

[11] Patent Number: 4,989,371
[45] Date of Patent: Feb. 5, 1991

[54] SEALING STRIP FOR MOTOR VEHICLES

[75] Inventors: Federico Mancosu; Giovanni Daminelli, both of Milan, Italy

[73] Assignee: Industrie Pirelli S.p.A., Milan, Italy

[21] Appl. No.: 370,191

[22] Filed: Jun. 22, 1989

[30] Foreign Application Priority Data

Jun. 24, 1988 [IT] Italy ................. 21092 A/88

[51] Int. Cl.⁵ .............................. E06B 7/16
[52] U.S. Cl. .......................... 49/497; 49/491; 49/498
[58] Field of Search ........... 49/497, 475, 490, 491, 49/496, 485, 482, 498

[56] References Cited

U.S. PATENT DOCUMENTS

| | | | |
|---|---|---|---|
| 2,899,721 | 8/1959 | Herman | 49/497 |
| 2,963,754 | 12/1960 | Herman | 49/497 |
| 4,495,234 | 1/1985 | Tominaga et al. | 49/498 X |
| 4,531,326 | 7/1985 | Ballocca et al. | 49/497 |
| 4,619,077 | 10/1986 | Azzola et al. | 49/497 |
| 4,745,016 | 5/1988 | Hashimoto et al. | 49/497 X |
| 4,765,936 | 8/1988 | Ballocca | 264/46.1 |

Primary Examiner—Philip C. Kannan
Attorney, Agent, or Firm—Stevens, Davis, Miller & Mosher

[57] ABSTRACT

The sealing strip includes a first structural member for anchoring the strip to the edge of an opening, such as a door or a trunk or the like, of a motor vehicle body, a second deformable structural member for providing sealing along the edge of the door or the like closing the opening in the vehicle body and a continuous rib interconnecting the first and second structural members. The rib has dimensions and/or geometrical configuration and/or physical properties which vary along a longitudinal axis of the strip.

16 Claims, 5 Drawing Sheets

SEALING STRIP FOR MOTOR VEHICLES

FIELD OF THE INVENTION

The present invention relates to a sealing strip for motor vehicles suitable for being anchored to the edge of openings of the motor vehicle body to provide a sealing along the contour of side doors, trunk doors and the like which close at said openings and are hinged to the motor vehicle body.

BACKGROUND OF THE INVENTION

Conventional strips suitable for the above-described use comprise two structural shapes of polymeric material connected together by a continuous rib which has constant dimensions and which is also formed of polymeric material with the function of the rib being to connect together the two structural shapes.

Of these two structural shapes, the former has the function of anchoring the strip to the motor vehicle body and comprises means for securing the strip to the vehicle body, while the latter has the function of providing a sealing of the strip and is compressed against the contour of the side doors, trunk doors and the like when these latter are closed relative to the opening of the motor vehicle body.

Usually, the second structural shape is in the form of a tubular body formed of foamed material and is elastically deformable. Herein, the term "tubular body" means a body provided with a cavity in a radially innermost position with respect to the body, the section of which can have any configuration whatsoever; therefore, the contours of the inner cavity and of the outer surface of the tubular body can be, for example, circular, non-concentric, elliptical, polygonal with rectilinear or curvilinear sides equal or different from one another, and combinations of the above geometrical configurations.

The problem that appears in the strips in question is to guarantee a reliable and efficient sealing at any point between the side door, trunk door and the like and the contour of the motor vehicle body to insulate the interior compartment of this latter against water infiltration and noise caused by outside sources and to require at the same time the least possible effort by the user to bring the side doors, trunk doors and the like into closing position.

The solution of the above problem requires the mediation of the above-noted two opposite requirements.

In fact, to ensure a good sealing it is necessary that the strip exert a fairly high and uniform specific pressure on the contour of the door of a motor vehicle, and this in turn requires a fairly high force applied on the strip by the door in the closing position. This is clearly in contrast with the requirement of the user to exert the least possible effort and, consequently, to apply the least possible force to close the door itself.

The solution of the problem in question is complicated by the fact that in a motor vehicle having a door in its closing position, the distance between the contour of the opening and the contour of the door closing the opening is not constant, but is variable also in a relatively considerable measure not only between the various openings of the body of the same motor vehicle, but also in the openings of motor vehicles of different models.

In order to solve the above-described problem, the heretofore known strips vary the dimensions of the second tubular structural shape of foamed material.

More precisely, in the known strips the second tubular structural shape of foamed material is variable longitudinally along the strip in its outer diametral dimensions, thickness and thickness profile.

The drawbacks of the above-described known strips derive from the fact that the second structural shape of foamed material has dimensions variable along the strip as set forth above.

In fact, it is very difficult and requires the use of very complicated and consequently very delicate production equipment to realize with precision, on industrial scales, variations of the outer diameter, thickness and distribution of thicknesses along the tubular structural shape, which is of foamed material.

It is noted that the variations in question must be carried out in fairly reduced portions and quite near one another, since the total length of a strip usually does not exceed three meters and also that the variations that permit the solution of the problem are effected contemporaneously with the foaming of the material. As a result, formation of these variations yields the risk of altering the foaming process simply as a consequence of said variations of dimensions.

The consequence of the foregoing results in practice in an insufficient utility by known strips to solve reliably on an industrial scale the previously stated problem connected with the sealing strips of motor vehicles.

SUMMARY OF THE INVENTION

It is an object of the present invention to provide a sealing strip for motor vehicles which solves in a reliable way on industrial scale the above-described problems while avoiding the drawbacks of the known sealing strips.

The object of the present invention is to provide a sealing strip for motor vehicles suitable for being anchored to the edge of openings of the motor vehicles bodies to achieve sealing along the contour of side doors, trunk doors and the like, hinged to said body, for closing said openings. The strip comprises a first structural shape provided with means for anchoring the strip to the motor vehicle body, a second elastically deformable sealing structural shape whose section perpendicular to its own longitudinal axis is uniform along the entire strip, and a continuous rib of polymeric material for connecting together the two structural shapes. The strip is characterized in that the continuous rib connecting the two structural shapes has variations of dimensions and/or geometrical configuration and/or physical properties along at least a portion of the strip.

BRIEF DESCRIPTION OF THE DRAWINGS

The above and other objects, advantages and features of the invention will be more fully understood when considered in conjunction with the following discussion and the attached drawings, of which.

DETAILED DESCRIPTION OF THE PREFERRED EMBODIMENTS

Figure 1:
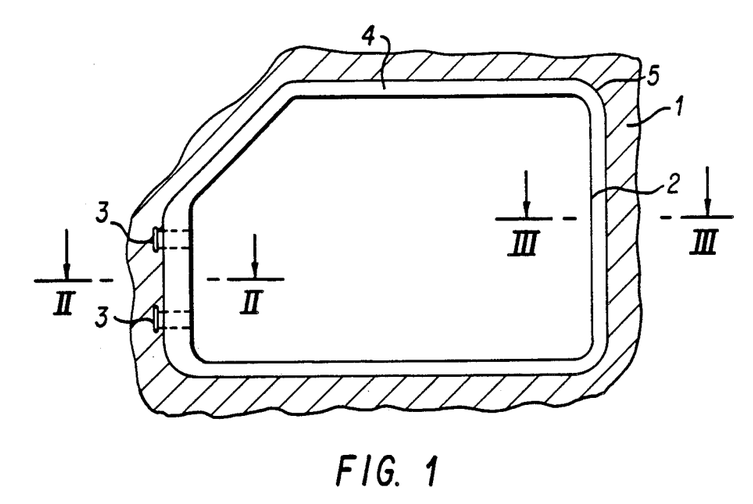
FIG. 1 shows schematically an opening of a motor vehicle body and the contour occupied by the edge of the door in said opening along which the strip must guarantee the sealing.

FIG. 1 shows one opening of a motor vehicle body 1, the contour 2 occupied by the edge of the door (not shown) when said door is in a closed position and the position of hinges 3 connecting the door with body 1.

Figure 2:
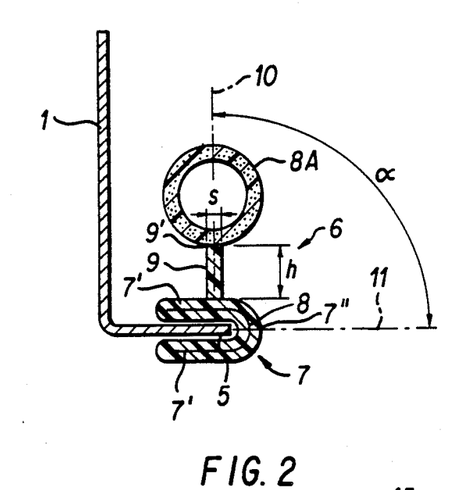
FIGS. 2 and 3 respectively show sections at lines II—II and III—III of the strip of FIG. 1.
Figure 3:
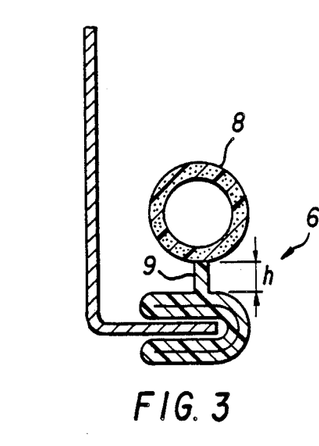
Figure 4:
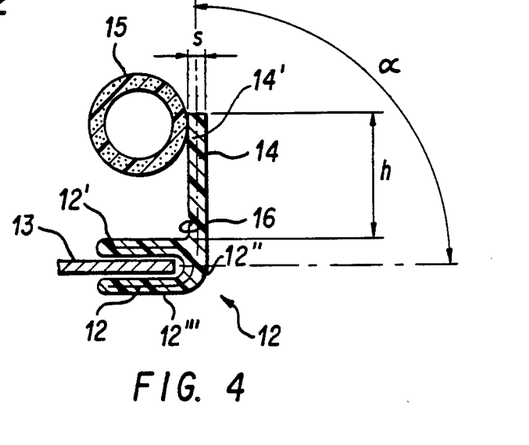
FIG. 4 is a section of an alternative sealing strip according to the invention.

As shown in FIG. 1, space 4 delimited between contour 5 of the opening in vehicle body 1 and contour 2 of the edge of the door when the door is in a closed position has variable dimensions and is occupied by a sealing strip 6 according to the invention as shown in FIGS. 2–4.

In its more general aspects a sealing strip 6 according to the invention comprises a first structural shape for anchorage to the contour of the opening of the motor vehicle body 1, a second sealing structural shape, which is elastically deformable and whose section does not vary in dimension and configuration longitudinally along the entire strip, and a continuous rib of polymeric material for interconnecting the two structural shapes.

For the purposes of the present invention, a signification feature is that the continuous rib of polymeric material for connecting the two structural shapes together has variations in its geometrical dimensions and/or geometrical configurations and/or physical properties along at least a portion of the strip.

In a strip according to the present invention, the first structural shape can be any shape, as well as the means contained or associated thereto, suitable for anchorage to the motor vehicle body.

Also, the second deformable sealing structural shape for a strip according to the invention can be any shape provided that its section, configuration and deformability maintain practically constant and unchanged longitudinally along the whole strip.

For instance, the second deformable structural shape can be constituted by a round bar having any cross-sectional configuration of elastically deformable material, in particular foamed elastomeric material, or can be a tubular body with a wall of elastic material, for instance compact elastomeric material whose cavity can be devoid of materials or may be filled with foamed material. Preferably, the second structural shape is in the form of a tubular body of foamed elastomeric material having a cross-section, configuration and dimensions invariable along the whole structural shape.

FIGS. 2 and 3 show two sections made in different positions of one particular embodiment of a strip 6 according to the invention, and, precisely two sections made at the positions represented by lines II—II and III—III of FIG. 1, respectively, to which strip 6 is applied.

As shown in FIGS. 2 and 3, strip 6 comprises a first anchoring structural shape 7 having a U-shaped cross-sectional configuration that embraces contour 5 (FIG. 1) of an opening of motor vehicle body 1 and presses thereon.

First anchoring structural shape 7 is formed of elastomeric material and contains a sheet 8 which extends along flanges 7' and core 7" of the U-configuration of first structural shape 7.

A continuous rib 9 of compact polymeric material, in particular compact elastomeric material, projects from one of flanges 7' of structural shape 7.

At end 9' of rib 9, farthest from first structural shape 7, there is provided a second elastically deformable structural shape 8A formed of a tubular body having a wall formed of foamed elastomeric material.

As is apparent from FIGS. 2 and 3 that represent a particular strip according to the invention applied to achieve sealing in the particular embodiment shown in FIG. 1, rib 9 varies only with respect to its height longitudinally along the structural shape in response to the variations on the width of space 4.

In particular, the height "h" of rib 9 of strip 6 applied to body 1 assumes a maximum value at hinges 3 connecting the door with body 1 and a minimum value at the farthest positions from hinges 3.

Figure 5A:
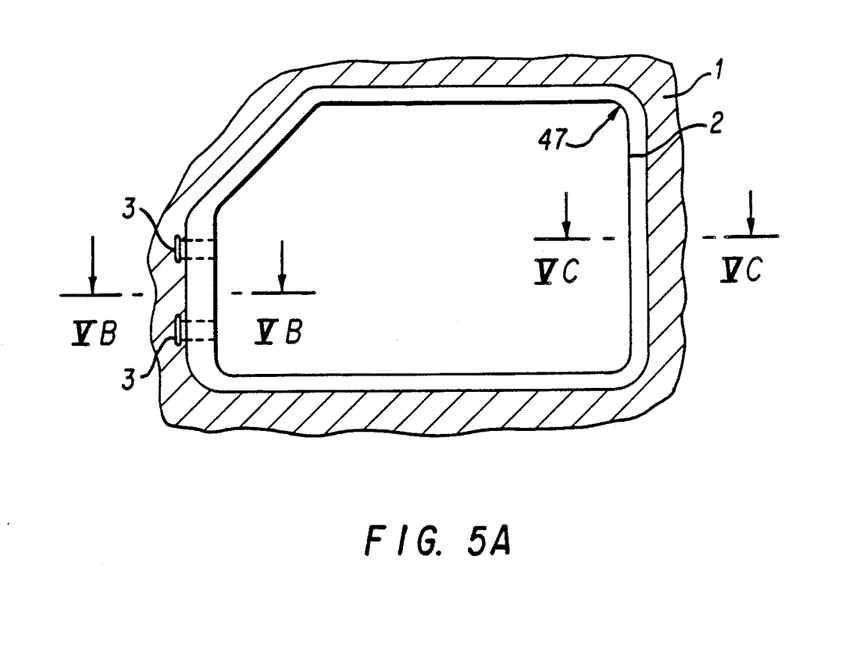
FIGS. 5A–5C illustrate another embodiment of a sealing strip according to the invention.
Figure 5B:
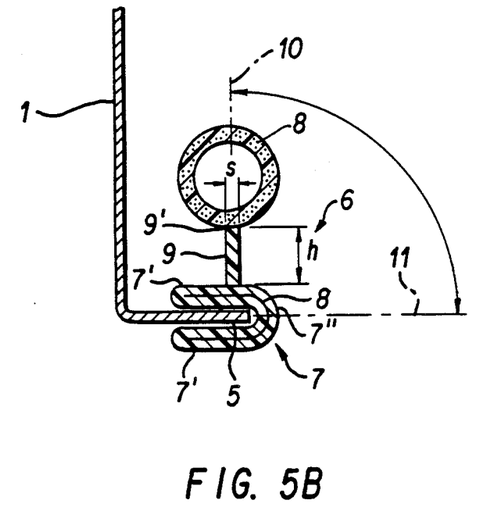
Figure 5C:
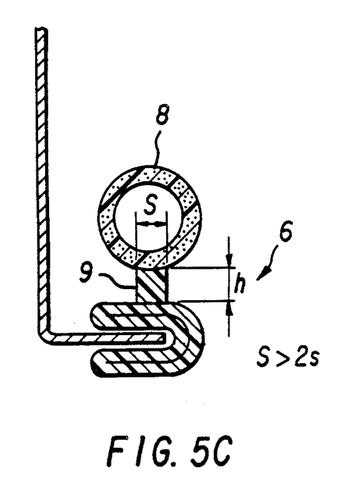

According to an alternative embodiment of a strip according to the present invention, the rib, besides having a variable height, also has a cross-sectional "s" shape variable along its development and at least the dimensions of section "s" (e.g., its width, the shape, relative sizes and orientations of the curved side portions of the "s") assumes a minimum value in proximity of and/or near hinge 3 and a maximum value in the farthest position from hinge 3. An example of this embodiment is shown in FIGS. 5A–5C. FIGS. 5B and 5C illustrate the variable cross sectional shape of the rib as having a minimum value at a position of the rib adapted to be located near hinges 3 of the motor vehicle body and a maximum value at a position of the rib adapted to be located farthest from hinges 3 of the motor vehicle body, when the strip is mounted on the opening of the motor vehicle body.

Figure 8:
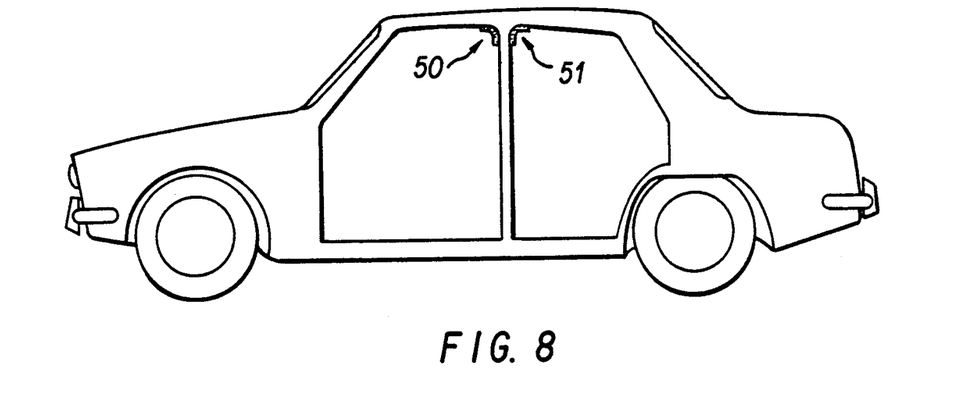
FIGS. 8 and 9 are views illustrating yet another embodiment of the invention.
Figure 9:
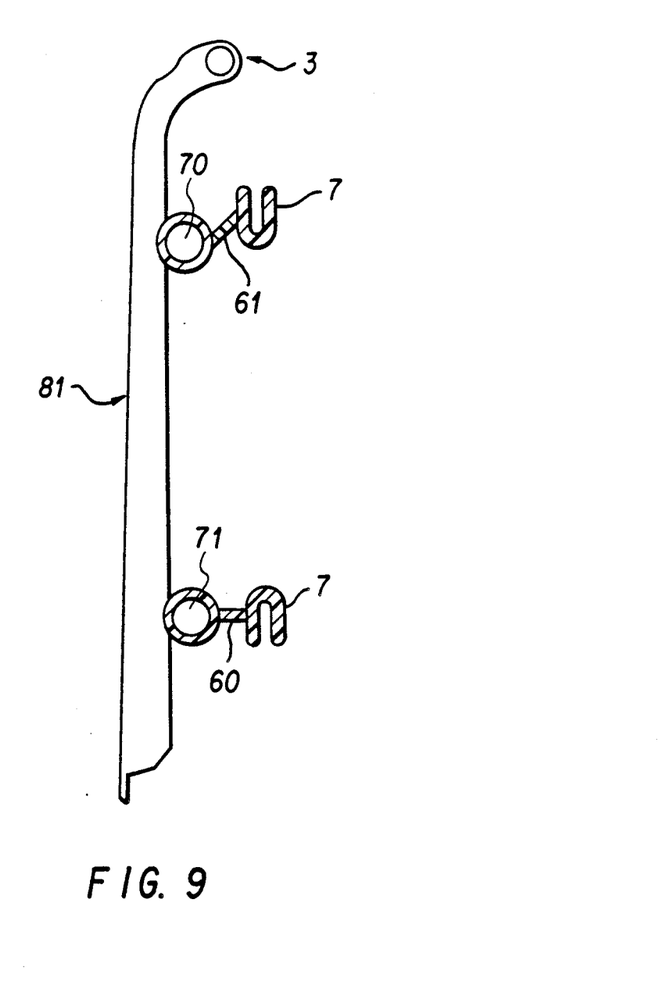

In a further embodiment of a strip according to the present invention, the rib, besides being variable in the height "h" and the dimensions of section "s", is also variable in the angle α (see FIGS. 2 and 4) that is formed between the longitudinal median plane of rib 9 (whose outline is represented by the dashed line 10 in FIG. 2) and the longitudinal median plane of first structural shape 7 (whose outline is represented by the dashed line 11 in FIG. 2). In the FIG. 1 embodiment, α is 90 degrees. FIG. 9 illustrates the above embodiment. FIG. 9 shows a top view of the car illustrated in FIG. 8, with a rib portion 60 which is perpendicular to the side of the car and a rib portion 61 which is inclined. The longitudinal median plane of rib portion 61 is inclined with respect to the longitudinal median plane of first structural member 7. The inclination of rib portion 61 allows car door 81 to be brought contemporaneously against the tubular parts 70 and 71 during the closing steps. This circumstance reduces the load requested for closing the door. Further, inclined rib portion 61 can be used to avoid flattening of the tubular part of a sealing strip along corner zones 50, 51 illustrated in FIG. 8. In fact, inclined rib portion 61 directed toward the vertex of the corner of the opening avoids the flattening of the sealing portion in the zone towards the center of bending.

In another embodiment of a strip according to the present invention, the rib, besides having the height "h", the dimensions of section "s", and angle α variable longitudinally along the strip, also has variable physical properties. In particular, such variable physical properties include the modulus "m" of elasticity of the compact polymeric material forming the rib. This variable modulus of elastic can be obtained, for example, by embedding in the material constituting the rib, or by applying on at least one surface of the rib, different quantities of natural or synthetic fibers in different portions of the same.

Figure 6A:
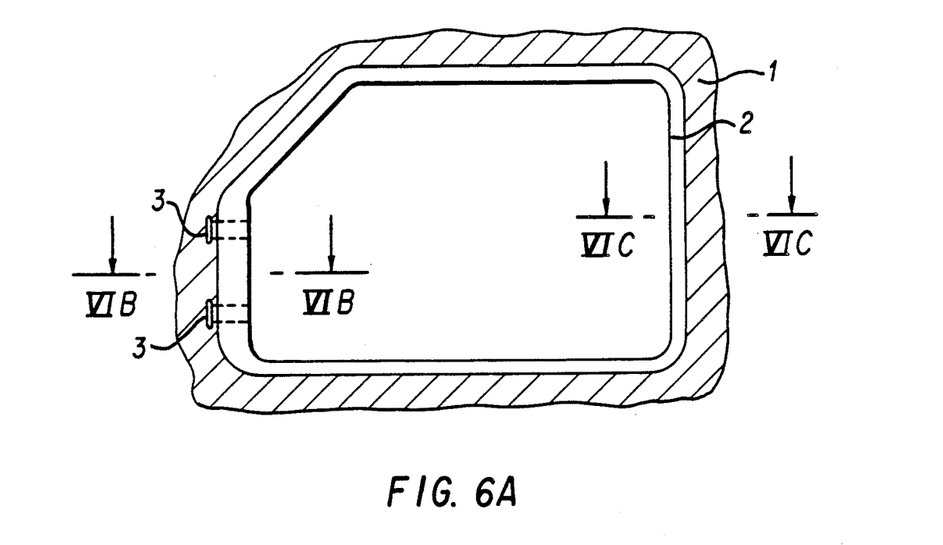
FIGS. 6A–6C illustrate an additional embodiment of a sealing strip according to the invention.
Figure 6B:
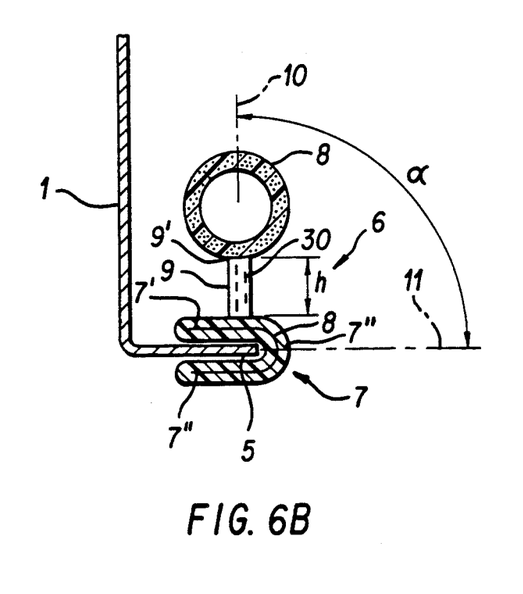
Figure 6C:
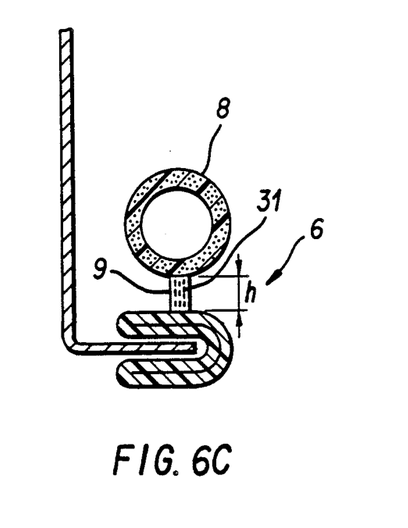
Figure 7A:
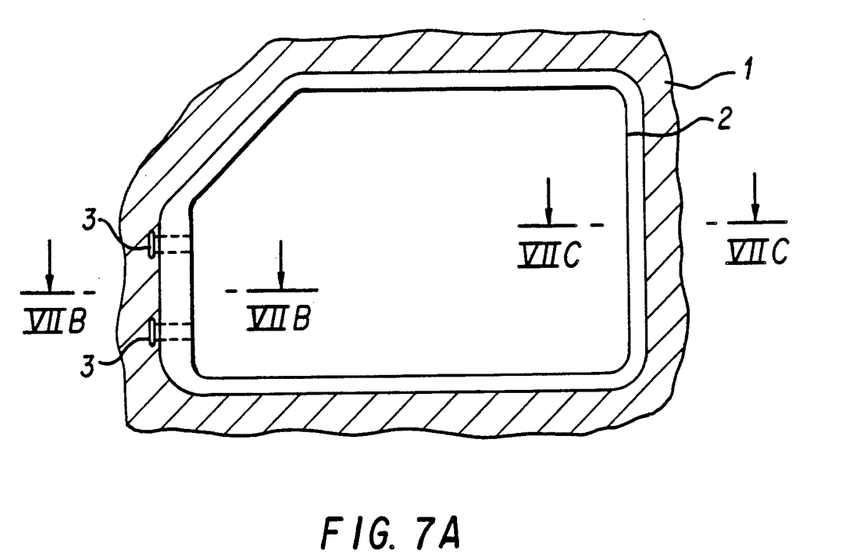
FIGS. 7A–7C illustrate still another embodiment of a sealing strip according to the invention.
Figure 7B:
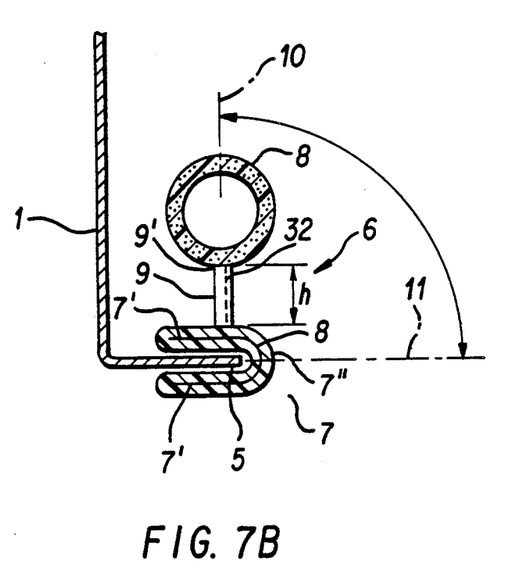
Figure 7C:
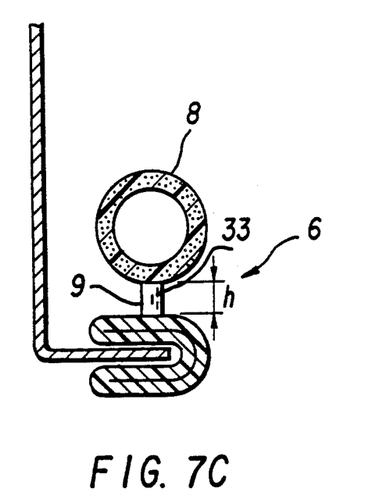

FIGS. 6A, 6B, 7A, and 7B illustrate examples of the last-mentioned embodiment. FIGS. 6B and 6C illustrate an embodiment wherein variable quantities of fibers are embedded in the rib at different longitudinal portions thereof. In FIGS. 6B and 6C, more fibers 31 are embedded in the rib at the farthest position from hinges 3 than the fibers 30 embedded in the rib at the closest position to hinges 3. In FIGS. 7B and 7C, more fibers 33 are embedded at the surface of rib 9 at one longitudinal portion thereof than fibers 32 located at another longitudinal position of the rib 9.

In a further embodiment (not shown) of a strip according to the invention, the rib, besides being variable longitudinally with respect to height "h", the dimensions of section "s", angle of inclination α and modulus "m", can have on at least one of its faces and for at least a portion of the strip at least one groove the depth and width of which can be variable longitudinally along the strip.

Further embodiments of a strip according to the invention (which are not illustrated with drawings) are those in which the rib is variable, at least for a portion of its longitudinal extent, with respect to at least any one of its own dimensional, configuration or physical characteristics chosen among height "h", dimensions of the section "s", angle of inclination α, modulus "m" of elasticity of the material constituting said rib, number of grooves on the rib, position of the grooves on the rib, and/or variability of the width and depth of the grooves along the rib and variations of the relative position of the rib with respect to the two structural shapes joined together by the rib along the strip.

Given that the profile of the distance existing between the contour of the opening of a motor vehicle body and the contour of the door or the like closing said opening is variable in a different way not only between the different openings of one same model of motor vehicle, but also in the openings of different models of motor vehicles, the invention enables a sealing strip to be achieved which provides simultaneously a uniform pressure between strip and edge of the motor vehicle door or the like that guarantees effective sealing and the least possible effort by the user to shut said door or the like by selecting which characteristic or characteristics among the above-mentioned characteristics of the rib must be varied and the way in which said variation is to take place.

FIG. 4 shows in section another particular embodiment of a strip according to the invention.

As is apparent from FIG. 4, the strip has a first U-shaped structural member 12 of polymeric material, in particular elastomeric material containing a sheet 12''. First U-shaped structural member 12 comprises two flanges 12' and a core 12'' for anchoring the strip to the motor vehicle body at edge 13 of an opening of the motor vehicle and to achieve this effect, flanges 12' of the U-shaped structural member 12 clamp edge 13 between them.

A rib 14 of compact polymeric material, in particular elastomeric material, projects from core 12'' of the U-shaped structural member 12.

At end 14' of rib 14 there is a tubular structural member 15 of foamed material, whose configuration and section are constant along the entire strip.

Rib 14 is substantially tangent to both structural members 12 and 15 and these latter are on the same part of rib 14; moreover, rib 14 has height "h", section "s" and modulus "m" of elasticity of the material constituting the rib and angle α of 90 degrees constant along the entire strip.

An important characteristic of the strip of FIG. 4 is the presence of a groove 16 in rib 14 that extends for a portion of the strip length along which the depth and width of groove 16 are variable.

In particular, the depth and width of groove 16 assume a maximum value in proximity of and/or at hinges 3 connecting the door or the like with the motor vehicle body and a minimum value, which can be zero, in the farthest position from said door or the like.

From the description of the previously stated several embodiments and from the following considerations, it is evident how a sealing strip according to the invention achieves the previously cited objectives.

In a strip according to the present invention, the second elastically deformable structural member which is adapted to make contact with the edge of the motor vehicle door to achieve sealing, has a configuration and dimensions practically invariable along the entire strip.

Therefore, especially in the case in which the elastically deformable structural member is a tubular body of foamed material, the constancy of inner and outer diametral dimensions, thickness and distribution of the thickness of the material eliminates any possible risk of alterations that may take place in the manufacture of the sealing strip during the foaming process of the constituting material.

Moreover, the absence of dimensional variations in the elastically deformable structural shape eliminates the operative complications involved in the manufacture of the structural shape.

In a strip according to the invention, the variations along the strip necessary to solve the dual objectives of guaranteeing sealing and requiring the least possible effort by the user to shut the door are achieved by the novel rib structure, which is formed of compact polymeric material which, unlike the foamed material, does not present any risk of suffering alterations and on which the variations, especially the geometrical ones, for instance, the forming of grooves in variable number and dimensions along the rib and the varying of thickness of the rib, are particularly simple to execute, do not present any difficulty of execution and do not require the use of complicated and delicate equipment for their realization.

It should be noted that the above description and the accompanying drawings are merely illustrative of the application of the principles of the present invention and are not limiting. Numerous other arrangements which embody the principles of the invention and which fall within its spirit and scope may be readily devised by those skilled in the art.

We claim:

1. A sealing strip for a motor vehicle adapted to be supported to an edge of an opening of a motor vehicle body to provide sealing along contours of side doors, trunk door, or other components connected by hinges to the motor vehicle body, said strip comprising:

a first elongated structural member including anchor means for anchoring the strip to the motor vehicle body;

a second elongated structural member formed of elastically deformable material, said second structural member having a substantially uniform shape along a cross-section thereof perpendicular to a longitudinal axis of said second structural member, said longitudinal axis of said second structural member being substantially parallel to a longitudinal axis of said first structural member;

an elongated rib formed of polymeric material, said rib interconnecting said first structural member and said second structural member, said rib having a longitudinal axis substantially parallel to said longitudinal axis of said first structural member and said longitudinal axis of said second structural member, said rib comprising means for simultaneously achieving effective sealing by said strip and facilitated closure of said doors or other components in response to application of a low closure force, said means comprising at least one portion of said rib including variations along said longitudinal axis of said rib with respect to one of geometric configuration, dimensions and physical properties.

2. The strip as in claim 1, wherein said one portion of said rib has a variable height, said height being defined as the distance between said first structural member and said second structural member interconnected by said rib.

3. The strip as in claim 1, wherein said rib is formed of a compact material.

4. The strip as in claim 1, wherein said rib is formed of a compact elastomeric material.

5. A sealing strip for a motor vehicle adapted to be supported to an edge of an opening of a motor vehicle body to provide sealing along contours of side doors, trunk doors, or other components connected by hinges to the motor vehicle body, said strip comprising:

a first elongated structural member including anchor means for anchoring the strip to the motor vehicle body;

a second elongated structural member formed of elastically deformable material, said second structural member having a substantially uniform shape along a cross-section thereof perpendicular to a longitudinal axis of said second structural member, said longitudinal axis of said second structural member being substantially parallel to a longitudinal axis of said first structural member;

an elongated rib formed of polymeric material, said rib interconnecting said first structural member and said second structural member, said rib having a longitudinal axis substantially parallel to said longitudinal axis of said first structural member and said longitudinal axis of said second structural member, said rib having at least one portion including variations along said longitudinal axis of said rib with respect to one of geometric configuration, dimensions and physical properties and wherein said one portion of said rib has a variable cross-sectional shape.

6. The strip as in claim 5, wherein said variable cross-sectional shape has a minimum value at a position of said rib adapted to be located near the hinges of the motor vehicle body and a maximum value at a position of said rib adapted to be located farthest from the hinges of the motor vehicle body, when said strip is mounted on the opening of the motor vehicle body.

7. A sealing strip for a motor vehicle adapted to be supported to an edge of an opening of a motor vehicle body to provide sealing along contours of side doors, trunk doors, or other components connected by hinges to the motor vehicle body, said strip comprising:

a first elongated structural member including anchor means for anchoring the strip to the motor vehicle body;

a second elongated structural member formed of elastically deformable material, said second structural member having a substantially uniform shape along a cross-section thereof perpendicular to a longitudinal axis of said second structural member, said longitudinal axis of said second structural member being substantially parallel to a longitudinal axis of said first structural member;

an elongated rib formed of polymeric material, said rib interconnecting said first structural member and said second structural member, said rib having a longitudinal axis substantially parallel to said longitudinal axis of said first structural member and said longitudinal axis of said second structural member, said ri having at least one portion including variations along said longitudinal axis of said rib with respect to one of geometric configuration, dimensions and physical properties, wherein said one portion of said rib has a variable height, said height being defined as the distance between said first structural member and said second structural member interconnected by said rib, and wherein said variable height has a maximum value at a position of said rib adapted to be located near the hinges of the motor vehicle body and a minimum value at a position of said rib adapted to be located farthest from the hinges of the motor vehicle body, when said strip is mounted on the opening of the motor vehicle body.

8. A scaling strip for a motor vehicle adapted to be supported to an edge of an opening of a motor vehicle body to provide sealing along contours of side doors, trunk doors, or other components connected by hinges to the motor vehicle body, said strip comprising:

a first elongated structural member including anchor means for anchoring the strip to the motor vehicle body;

a second elongated structural member formed of elastically deformable material, said second structural member having a substantially uniform shape along a cross-section thereof perpendicular to a longitudinal axis of said second structural member, said longitudinal axis of said second structural member being substantially parallel to a longitudinal axis of said first structural member;

an elongated rib formed of polymeric material, said rib interconnecting said first structural member and said second structural member, said rib having a longitudinal axis substantially parallel to said longitudinal axis of said first structural member and said longitudinal axis of said second structural member, said rib having at least one portion including variations along said longitudinal axis of said rib with respect to one of geometric configuration, dimensions and physical properties and wherein said one portion of said rib has a variable geometrical configuration provided by a longitudinal groove along a part of said one portion.

9. The strip as in claim 8, wherein said longitudinal groove has one of a variable depth and a variable width along its length.

10. The strip as in claim 9, wherein said longitudinal groove has a maximum depth at a position of said rib adapted to be located near the hinges of the motor vehicle body and a minimum depth at a position of said rib adapted to be located farthest from the hinges of the motor vehicle body, when the strip is mounted on the opening of the motor vehicle body.

11. The strip as in claim 9, wherein said longitudinal groove has a maximum width at a position of said rib adapted to be located near the hinges of the motor vehicle body and a minimum width at a position of said rib adapted to be located farthest from the hinges of the motor vehicle body, when the strip is mounted on the opening of the motor vehicle body.

12. A sealing strip for a motor vehicle adapted to be supported to an edge of an opening of a motor vehicle body to provide sealing along contours of side doors, trunk doors, or other components connected by hinges to the motor vehicle body, said strip comprising:
 a first elongated structural member including anchor means for anchoring the strip to the motor vehicle body;
 a second elongated structural member formed of elastically deformable material, said second structural member having a substantially uniform shape along a cross-section thereof perpendicular to a longitudinal axis of said second structural member, said longitudinal axis of said second structural member being substantially parallel to a longitudinal axis of said first structural member;
 an elongated rib formed of polymeric material, said rib interconnecting said first structural member and said second structural member, said rib having a longitudinal axis substantially parallel to said longitudinal axis of said first structural member and said longitudinal axis of said second structural member, said rib having at least one portion including variations along said longitudinal axis of said rib with respect to one of geometric configuration, dimensions and physical properties and wherein said one portion of said rib has a variable geometric configuration provided by a variable angle of inclination between a longitudinal medial plane of said rib and a longitudinal median plane of said first structural member.

13. A sealing strip for a motor vehicle adapted to be supported to an edge of an opening of a motor vehicle body to provide sealing along contours of side doors, trunk doors, or other components connected by hinges to the motor vehicle body, said strip comprising:
 a first elongated structural member including anchor means for anchoring the strip to the motor vehicle body;
 a second elongated structural member formed of elastically deformable material, said second structural member having a substantially uniform shape along a cross-section thereof perpendicular to a longitudinal axis of said second structural member, said longitudinal axis of said second structural member being substantially parallel to a longitudinal axis of said first structural member;
 an elongated rib formed of polymeric material, said rib interconnecting said first structural member and said second structural member, said rib having a longitudinal axis substantially parallel to said longitudinal axis of said first structural member and said longitudinal axis of said second structural member, said rib having at least one portion including variations along said longitudinal axis of said rib with respect to one of geometric configuration, dimensions and physical properties and wherein said one portion of said rib has variable physical properties provided by a longitudinally variable modulus of elasticity of a material forming said rib.

14. The strip as in claim 13, wherein said longitudinally variable modulus of elasticity is provided by variable quantities of fibers embedded in said rib at different longitudinal portions thereof.

15. The strip as in claim 13, wherein said longitudinally variable modulus of elasticity is provided by variable quantities of fibers disposed on a surface of said rib at different longitudinal portions thereof.

16. A sealing strip for a motor vehicle adapted to be supported to an edge of an opening of a motor vehicle body to provide sealing along contours of side doors, trunk doors, or other components connected by hinges to the motor vehicle body, said strip comprising:
 a first elongated structural member including anchor means for anchoring the strip to the motor vehicle body;
 a second elongated structural member formed of elastically deformable material, said second structural member having a substantially uniform shape along a cross-section thereof perpendicular to a longitudinal axis of said second structural member, said longitudinal axis of said second structural member being substantially parallel to a longitudinal axis of said first structural member;
 an elongated rib formed of polymeric material, said rib interconnecting said first structural member and said second structural member, said rib having a longitudinal axis substantially parallel to said longitudinal axis of said first structural member and said longitudinal axis of said second structural member, said rib having at least one portion including variations along said longitudinal axis of said rib with respect to one of geometric configuration, dimensions and physical properties and wherein said rib is oriented substantially tangent to both said first structural member and said second structural member, and wherein said first structural member and said second structural member ar both located on a same side of said rib.

* * * * *